United States Patent
Marin

(10) Patent No.: US 8,138,285 B2
(45) Date of Patent: Mar. 20, 2012

(54) FLUORINATED IMPREGNATED CATALYST SYSTEMS AND METHODS OF FORMING THE SAME

(75) Inventor: Vladimir Marin, Houston, TX (US)

(73) Assignee: Fina Technology, Inc., Houston, TX (US)

( * ) Notice: Subject to any disclaimer, the term of this patent is extended or adjusted under 35 U.S.C. 154(b) by 373 days.

(21) Appl. No.: 12/102,226

(22) Filed: Apr. 14, 2008

(65) Prior Publication Data

US 2009/0111955 A1    Apr. 30, 2009

Related U.S. Application Data

(63) Continuation-in-part of application No. 11/978,002, filed on Oct. 26, 2007.

(51) Int. Cl.
C08F 4/02 (2006.01)
C08F 4/60 (2006.01)
C08F 4/6592 (2006.01)
B01J 31/22 (2006.01)

(52) U.S. Cl. ........ 526/158; 502/103; 502/104; 502/119; 502/120; 502/152; 526/154; 526/170; 526/943

(58) Field of Classification Search .................. 502/103, 502/104, 120, 152, 119; 526/154, 158, 170, 526/943

See application file for complete search history.

(56) References Cited

U.S. PATENT DOCUMENTS

| | | | |
|---|---|---|---|
| 4,339,559 A * | 7/1982 | McDaniel | 526/106 |
| 4,607,019 A | 8/1986 | Best | |
| 4,895,822 A | 1/1990 | Okazaki et al. | |
| 5,219,817 A | 6/1993 | McDaniel | |
| 5,221,654 A | 6/1993 | McDaniel | |
| 5,221,655 A | 6/1993 | McDaniel | |
| 5,438,027 A | 8/1995 | Reagen | |
| 5,840,644 A | 11/1998 | Kuber | |
| 6,107,230 A | 8/2000 | McDaniel | |
| 6,144,897 A | 11/2000 | De Selliers | |
| 6,235,918 B1 | 5/2001 | Marks | |
| 6,300,271 B1 | 10/2001 | McDaniel | |
| 6,316,553 B1 | 11/2001 | McDaniel | |
| 6,355,594 B1 | 3/2002 | McDaniel | |
| 6,368,999 B1 | 4/2002 | Speca | |
| 6,395,666 B1 | 5/2002 | McDaniel | |
| 6,524,987 B1 | 2/2003 | Collins | |
| 6,573,344 B1 | 6/2003 | Hawley | |
| 6,613,712 B1 | 9/2003 | McDaniel | |
| 6,613,852 B2 | 9/2003 | McDaniel | |
| 6,689,846 B1 | 2/2004 | Leskinen et al. | |
| 6,723,804 B1 | 4/2004 | Battiste | |
| 6,750,307 B2 | 6/2004 | Weng | |
| 6,780,946 B2 | 8/2004 | Saudemont | |
| 6,831,141 B2 | 12/2004 | McDaniel | |
| 6,884,748 B2 | 4/2005 | McCullough | |
| 6,890,876 B2 | 5/2005 | McCullough et al. | |
| 6,984,603 B2 | 1/2006 | McDaniel | |
| 7,001,968 B2 | 2/2006 | McDaniel | |
| 7,109,277 B2 | 9/2006 | Hawley | |
| 7,148,298 B2 | 12/2006 | Jensen | |
| 2002/0161141 A1 | 10/2002 | Mawson et al. | |
| 2003/0054952 A1 | 3/2003 | Takahashi | |
| 2005/0054790 A1 | 3/2005 | Mawson | |
| 2005/0165183 A1 | 7/2005 | McCullough | |
| 2005/0233892 A1 | 10/2005 | Tian et al. | |
| 2005/0266982 A1 | 12/2005 | Holtcamp | |
| 2005/0288462 A1 | 12/2005 | Jensen et al. | |
| 2006/0052552 A1 | 3/2006 | Vuorikari et al. | |
| 2006/0089470 A1 | 4/2006 | Lopez et al. | |
| 2007/0123414 A1 | 5/2007 | Kao et al. | |
| 2007/0255026 A1 | 11/2007 | Razavi | |
| 2009/0042720 A1 | 2/2009 | Prades et al. | |

FOREIGN PATENT DOCUMENTS

EP    1559730 A1    8/2005

OTHER PUBLICATIONS

Varkey et al. "Zeolite MCM-22 Supported Heterogeneous Chromium Catalyst for Ethylene Polymerization" Catalyst Letters, 2003, vol. 88, pp. 227-229.
G.C. Ardell, B. Gurnowski; "Model Prediction for Reactor Control"; CEP Jun. 1983; XP000600528; pp. 77-83.

* cited by examiner

Primary Examiner — Caixia Lu

(57) ABSTRACT

Methods of forming supported catalyst systems, supported catalyst systems and polymerization processes utilizing the supported catalyst systems are described herein. The methods generally include providing an inorganic support material and contacting the inorganic support material with a support solvent to form a support solution. The methods further include contacting the support solution with a fluorine containing compound represented by the formula $AlF_pX_{3-p}B_q$ to impregnate the fluorine containing compound within the inorganic support material and form an intermediate, wherein X is selected from Cl, Br and OH⁻, B is $H_2O$, p is selected from 1 to 3 and q is selected from 0 to 6. In addition, the methods include drying the intermediate to remove the solvent therefrom and heating the intermediate at a temperature of at least about 300° C. to form an impregnated support and contacting the impregnated support with a transition metal compound to form a supported catalyst system, wherein the transition metal compound is represented by the formula $[L]_mM[A]_n$; wherein L is a bulky ligand, A is a leaving group, M is a transition metal and m and n are such that a total ligand valency corresponds to the transition metal valency.

18 Claims, No Drawings

FLUORINATED IMPREGNATED CATALYST SYSTEMS AND METHODS OF FORMING THE SAME

CROSS-REFERENCE TO RELATED APPLICATIONS

This application is a continuation in part of U.S. patent application Ser. No. 11/978,002, filed Oct. 26, 2007.

FIELD

Embodiments of the present invention generally relate to supported catalyst compositions and methods of forming the same.

BACKGROUND

Many methods of forming olefin polymers include contacting olefin monomers with transition metal catalyst systems, such as metallocene catalyst systems, to form polyolefins. While it is widely recognized that the transition metal catalyst systems are capable of producing polymers having desirable properties, the transition metal catalysts generally do not experience commercially viable activities.

Therefore, a need exists to produce transition metal catalyst systems having enhanced activity.

SUMMARY

Embodiments of the invention generally include methods of forming supported catalyst systems. The methods generally include providing an inorganic support material and contacting the inorganic support material with a support solvent to form a support solution. The methods further include contacting the support solution with a fluorine containing compound represented by the formula $AlF_pX_{3-p}B_q$ to impregnate the fluorine containing compound within the inorganic support material and form an intermediate, wherein X is selected from Cl, Br and $OH^-$, B is $H_2O$, p is selected from 1 to 3 and q is selected from 0 to 6. In addition, the methods include drying the intermediate to remove the solvent therefrom and heating the intermediate at a temperature of at least about 300° C. to form an impregnated support and contacting the impregnated support with a transition metal compound to form a supported catalyst system wherein the transition metal compound is represented by the formula $[L]_mM[A]_n$; wherein L is a bulky ligand, A is a leaving group, M is a transition metal and m and n are such that a total ligand valency corresponds to the transition metal valency.

In one or more embodiments, the fluorine containing compound is represented by the formula $AlF_3$ or $AlF_3 \cdot 3H_2O$.

In one or more embodiments, the contact of the support solution with the fluorine containing compound forms chemical bonds resulting in an intermediate exhibiting a bonding sequence selected from Si—O—Al—F and Si—O—Al—O—Al—F.

One or more embodiments include olefin polymerization processes. The olefin polymerization processes include contacting the supported catalyst system with an olefin monomer to form a polyolefin, wherein the polyolefin comprises a polymer selected from ethylene, a $C_3$ or greater alpha olefin, a $C_4$ or greater conjugated diene, an ethylene-alpha olefin copolymer or combinations thereof.

DETAILED DESCRIPTION

Introduction and Definitions

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments versions or examples, which are included to enable a person having ordinary skill in the art to make and use the inventions when the information in this patent is combined with available information and technology.

Various terms as used herein are shown below. To the extent a term used in a claim is not defined below, it should be given the broadest definition persons in the pertinent art, have given that term as reflected in printed publications and issued patents at the time of filing. Further, unless otherwise specified, all compounds described herein may be substituted or unsubstituted and the listing of compounds includes derivatives thereof.

Various ranges are further recited below. It should be recognized that unless stated otherwise, it is intended that the endpoints are to be interchangeable. Further, any point within that range is contemplated as being disclosed herein.

Embodiments of the invention generally include methods of forming supported catalyst systems.

Catalyst Systems

The supported catalyst systems generally include a support material and a transition metal compound, which are described in greater detail below. The supported catalyst systems are generally formed by contacting the support material with a fluorine containing compound to form a support impregnated with the fluorine containing compound and then contacting the impregnated support with a transition metal compound to form a supported catalyst system.

The "support material" as used herein refers to the support material prior to contact with the "fluorine containing compound", discussed in further detail below, and, in one embodiment, includes an inorganic support composition. The inorganic support compositions generally include materials known to one skilled in the art, such as talc, inorganic oxides, clays and clay minerals, ion-exchanged layered compounds, diatomaceous earth compounds, zeolites or a resinous support material, such as a polyolefin, for example. Specific inorganic oxides include silica alumina, magnesia, titania, zirconia and combinations thereof, for example.

In one or more embodiments, the support material includes silica. In another embodiment, the support material includes an alumina-silica (which may be used interchangeably herein with the term silica-alumina).

In one or more embodiments, the support material may have an effective number of reactive hydroxyl groups, e.g., a number that is sufficient for binding the fluorine containing compound to the support material. For example, the number of reactive hydroxyl groups ($OH^-$) in excess of the number needed to bind the fluorine containing compound to the support material may be minimized. In one embodiment, the support material may include from about 0.1 mmol $OH^-$/g Si to about 5 mmol $OH^-$/g Si, or from about 0.5 mmol $OH^-$/g Si to about 4 mmol OH⁻/g Si or from about 1.0 mmol OH⁻/g Si to about 3 mmol OH⁻/g, Si, for example.

Embodiments of the invention include contacting the support material with the fluorine containing compound to impregnate the fluorine containing compound within the support material, thereby forming an intermediate. Attempts to create highly active (e.g., greater than about 10,000 g/g/hr) transition metal catalysts have recently included utilizing fluorine salts and ammonium fluorides, for example, to fluorinate support materials. However, when such processes have approached commercial production, environmental concerns have been raised (e.g., such processes may result in ammonia releases into the environment). Embodiments of the invention provide for the formation of fluorinated supports without the production of hazardous by-products. The term "commercial production" refers to polymer production of at least, 1 ton/hour over a period of at least 5 days. For example, commercial production may include polymer production of from about 1 ton/hour to about 5 tons/hour, or from about 1 ton/hour to about 50 tons/hour for a period of from about 5 days to about 2 years.

The fluorine containing compound of the present invention includes a compound including aluminum and fluorine. For example, in one embodiment, the fluorine containing compound is generally represented by the formula $AlF_pX_{3-p}B_q$, wherein X is selected from Cl, Br and OH⁻, B is H2O, p is selected from 1 to 3 and q is selected from 0 to 6. In one embodiment, the fluorine containing compound is aluminum trifluoride. In another embodiment, the fluorine containing compound is $AlF_3 \cdot 3H_2O$ Prior to contact with the fluorine containing compound, the support material is put into solution via methods known to one skilled in the art, such as by a chemical reaction of a support material species, such as an inorganic silica source or a silicon organometallic compound, with a solvent (hereinafter referred to as a "support solvent"), such as water, an alcohol or an acid, to form a support solution. In one or more embodiments, the support solution has a neutral pH.

The fluorine containing compound is added to the support solution, which then condenses to form a three dimensional, support network (which may in some embodiments be referred to as a "fluorination process"). As a result of adding the fluorine containing compound to the support solution, the support solvent and the fluorine containing compound remain within the pores of the support network, forming a gel, (i.e., the fluorine containing compound is impregnated within the support network and not on the surface of the support material). It is to be noted that the fluorine containing compound is added to the support solution and not to the precipitated support gel.

In one specific embodiment, the fluorine containing compound is added to a silica solution (e.g., a solution formed from an inorganic silica source). In another embodiment, a silica solution and an alumina solution are separately prepared and then contacted with one another to form an alumina-silica support solution. The fluorine containing compound is then added to the alumina-silica support solution. In an alternative embodiment, the fluorine containing compound is added to an alumina solution prior to contact with a silica solution.

The fluorination process may include contacting the support solution with the fluorine containing compound at a temperature of from room temperature to about 250° C., or from about 150° C. to about 200° C. or at a temperature of less than about 300° C. for a time of from about 1 hour to about 10 hours, or from about 1 hour to about 5 hours or from about 30 minutes to about 4 hours, for example, to form the impregnated support. As used herein, "room temperature" means that a temperature difference of a few degrees does not matter to the phenomenon under investigation, such as a preparation method. In some environments, room temperature may include a temperature of from about 20° C. to about 28° C. (68° F. to 82° F.), while in other environments, room temperature may include a temperature of from about 50° F. to about 90° F., for example. However, room temperature measurements generally do not include close monitoring of the temperature of the process and therefore such a recitation does not intend to bind the embodiments described herein to any predetermined temperature range.

Upon contact of the support solution with the fluorine containing compound, chemical bonds are formed, resulting in an intermediate exhibiting a bonding sequence of Fl—Al—O—Si or Fl—Al—O—Al—O—Si. As used herein, the term "bonding sequence" refers to an element's sequence, wherein each element is connected to another by sigma bonds, dative bonds, ionic bonds or combinations thereof, for example.

Embodiments of the invention further include drying the intermediate at a temperature of less than about 200° C., or less than about 300° C. or from about 20° C. to about 150° C. for a time of at least about 1 hour, or from about 1 hour to about 24 hours or from about 1.5 hours to about 5 hours, for example. The intermediate is heated to remove the support solvent located within the pores of the support material while retaining the fluorine containing compound impregnated therein.

Embodiments of the invention further include heating the dried intermediate at a temperature of at least about 200° C., or from about 300° C. to about 600° C. or from about 400° C. to about 500° C. for a time of at least about 1 hour, or from about 1 hour to about 10 hours or from about 1.5 hours to about 5 hours, for example, to form a support which may have a modified chemical structure (described herein as the "impregnated support"). For example, the intermediate is heated to obtain an impregnated support having a desired particle size and composition.

In one or more embodiments, the impregnated support may have a pore volume of from about 0.1 cc/g to about 5 cc/g, or from about 0.5 cc/g to about 3.5 cc/g, or from about 0.5 cc/g to about 2.0 cc/g or from about 1.0 cc/g to about 1.5° cc/g, for example.

In, one or more embodiments, the impregnated support may have an alumina content of from about 0.5 wt. % to about 95 wt. %, or from about 0.1 wt. % to about 20 wt. %, or from about 0.1 wt. % to about 50 wt. %, or from about 1 wt. % to about 25 wt. %, or from about 7 wt. % to about 15 wt. % or at least about 10 wt. %, for example.

In one or more embodiments, the impregnated support may include at least about 1 wt. %, or at least about 2 wt. % or at least about 5 wt. % of the fluorine containing compound, for example.

In one or more embodiments, the impregnated support may have an average particle size of from about 5' microns to 100 microns, or from about 15 microns to about 30 microns, or from about 10, microns to 100 microns or from about 10 microns to about 30 microns, for example. The impregnated support may further have a surface area of, from 50 m² g to 1,000 m²/g, or from about 80 m²/g to about 800 m²/g, or from 100 m²/g to 400 m²/g, or from about 200 m²/g to about 300 m²/g or from about 150 m²/g to about 300 m²/g, for example.

In one or more embodiments, the impregnated support has a particle size within the nano-particle, range. As used herein, the term "nano-particle," refers to particles having a size of less than about 100 nm.

Embodiments of the invention generally include contacting the impregnated support with a transition metal compound to form a supported catalyst composition. Such processes are generally known to ones skilled in the art and may include charging the transition metal compound in an inert solvent. Although the process is discussed below in terms of charging the transition metal compound in an inert solvent, the impregnated, support (either in combination with the transition metal compound or alternatively) may be mixed with the inert solvent to form a support slurry prior to contact with the transition metal compound. Methods for supporting transition metal catalysts are generally known in the art. (See, U.S. Pat. Nos. 5,643,847, 6,184,358 and U.S. Pat. No. 6,184,389, which are incorporated by reference herein.)

A variety of solvents may be utilized as the inert solvent, but any inert solvent selected should remain in liquid form at all relevant reaction temperatures and the ingredients used to form the supported catalyst composition should be at least partially soluble, in the inert solvent.

Suitable inert solvents include substituted and unsubstituted aliphatic hydrocarbons, substituted and unsubstituted aromatic hydrocarbons and mineral oil. For example, the inert solvent may include hexane, heptane, octane, decane, toluene, xylene, dichloromethane, chloroform, 1-chlorobutane or combinations thereof. In one specific, embodiment, the inert solvent includes isohexane. In another embodiment, the inert 'solvent includes' mineral oil including an amount of toluene.

The transition metal compound and the impregnated support may be contacted at a reaction temperature of from about −60° C. to about 120° C. or from about −45° C. to about 100° C. or at a reaction'temperature below about 90° C., e.g., from about 0° C. to about 50° C.; or from about 20° C. to, about 30° C. or at room temperature, for example, for a time of from about 10 minutes to about 5 hours or from about 30 minutes to about 120 minutes, for example.

In addition, and depending on the desired degree of substitution, the weight ratio of fluorine to transition metal (F:M) may be from about 1:1 equivalent to about 20:1 equivalents, or from about 1:1 to about 15:1 equivalents or from about 1:1 to about 5:1 equivalents, for example. In one embodiment, the supported catalyst composition includes from about 0.11 wt. % to about 5 wt. %, or from about 0.5 wt. % to about 4 wt. % or from about 1 wt. % to about 3 wt. % transition metal compound.

Upon completion of the reaction, the inert solvent, along with reaction by-products, may be removed from the mixture in a conventional manner, such as by evaporation or filtering, to obtain a dry, supported catalyst composition. For example, the supported catalyst composition may be dried in the presence of magnesium sulfate. The filtrate, which contains the supported catalyst composition in high purity and yield can, without further processing, be directly used in the polymerization of olefins if the solvent is a hydrocarbon. In such a process, the impregnated support and the transition metal compound are contacted prior to subsequent polymerization (e.g., prior to entering a reaction vessel). Alternatively, the process may include contacting the impregnated support with the transition metal in proximity to contact with an olefin monomer (e.g., contact within a reaction vessel). One or more embodiments include carrying out the catalyst preparation (contacting the transition metal compound and the impregnated support) without catalyst isolation (e.g., in-situ).

In one or more embodiments, the transition metal compound includes a metallocene catalyst, a late transition metal catalyst, a post metallocene catalyst or combinations thereof. Late transition metal catalysts may be characterized generally as transition metal catalysts including late transition metals, such as nickel, iron or palladium, for example. Post metallocene catalysts may be characterized generally as transition metal catalysts including Group IV, V or VI metals, for example. A brief discussion of metallocene catalyst, systems is included below, but is in no way intended to limit the scope of the invention to such catalysts.

Metallocene catalysts may be characterized generally as coordination compounds incorporating one or more cyclopentadienyl (Cp) groups (which may be substituted or unsubstituted, each substitution being the same or different) coordinated with a transition metal.

The substituent groups, on. Cp may be linear, branched or cyclic hydrocarbyl radicals, for example. The inclusion of cyclic hydrocarbyl radicals may transform the Cp into other contiguous ring structures, such as indenyl, azulenyl and fluorenyl groups, for example. These contiguous ring structures may also be substituted or unsubstituted by hydrocarbyl radicals, such as $C_1$ to $C_{20}$ hydrocarbyl radicals, for example.

A specific, non-limiting, example of a metallocene catalyst is a bulky ligand metallocene compound generally represented by the formula:

wherein L, is a bulky ligand, A is a leaving group, M is a transition metal and m and n are such that the total ligand valency corresponds to the transition metal valency. For example m may be from 1 to 4 and n may be from 0 to 3.

The metal atom "M" of the metallocene catalyst compound, as described throughout the specification and claims, may be selected from Groups 3 through 12 atoms and lanthanide Group atoms, or from Groups 3 through 10 atoms or from Sc, Ti, Zr, Hf, V, Nb, Ta, Mn, Re, Fe, Ru, Os, Co, Rh, Ir and Ni. The oxidation state of the metal atom "M" may range from 0 to +7 or is +1, +2, +3, +4 or +5, for example.

The bulky ligand generally includes a cyclopentadienyl group (Cp) or a derivative thereof. The Cp ligand(s) form at least one chemical bond with the metal atom M to form the "metallocene catalyst". The Cp ligands are distinct from the leaving groups bound to the catalyst compound in that they are not as highly susceptible to substitution/abstraction reactions as the leaving groups.

Cp ligands may include ring(s) or ring system(s) including atoms selected from group 13 to 16 atoms, such as carbon, nitrogen, oxygen, silicon, sulfur, phosphorous, germanium, boron, aluminum and combinations thereof, wherein carbon makes up at least 50°% of the ring members. Non-limiting examples of the ring or ring systems include cyclopentadienyl, cyclopentaphenanthreneyl, indenyl, benzindenyl, fluorenyl, tetrahydroindenyl, octahydrofluorenyl, cyclooctatetraenyl, cyclopentacyclododecene, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated versions thereof (e.g., 4,5, 6,7-tetrahydroindenyl or "$H_4$Ind"), substituted versions thereof and heterocyclic versions thereof, for example.

Cp substituent groups may include hydrogen radicals, alkyls (e.g., methyl, ethyl, propyl, butyl, pentyl, hexyl, fluoromethyl, fluoroethyl, difluoroethyl, iodopropyl, bromohexyl, benzyl, phenyl, methylphenyl, tert-butylphenyl, chlorobenzyl, dimethylphosphine and methylphenylphosphine), alkenyls (e.g., 3-butenyl, 2-propenyl and 5-hexenyl), alkynyls, cycloalkys (e.g., cyclopentyl and cyclohexyl), aryls (e.g., trimethylsilyl, trimethylgermyl, methyldiethylsilyl, acyls, aroyls, tris(trifluoromethyl)silyl, methylbis(difluoromethyl)silyl and bromomethyldimethylgermyl), alkoxys (e.g., methoxy, ethoxy, propoxy and phenoxy), aryloxys, alkylthiols, dialkylamines (e.g., dimethylamine and diphenylamine), alkylamidos, alkoxycarbonyls, aryloxycarbonyls, carbamoyls, alkyl- and dialkyl-carbamoyls, acyloxys, acylaminos, aroylaminos, organometalloid radicals (e.g., dimethylboron), Group 15 and Group 16 radicals (e.g., methylsulfide and ethylsulfide) and combinations thereof, for example. In one embodiment, at least two substituent groups, two adjacent substituent groups in one embodiment, are joined to form a ring structure.

Each leaving group "A" is independently selected and may include any ionic leaving group, such as halogens (e.g., chloride and fluoride), hydrides, $C_1$ to $C_{12}$ alkyls (e.g., methyl, ethyl, propyl, phenyl, cyclobutyl, cyclohexyl, heptyl, tolyl, trifluoromethyl, methylphenyl, dimethylphenyl and trimethylphenyl), $C_2$ to $C_{12}$ alkenyls (e.g., $C_2$ to $C_6$ fluoroalkenyls), $C_6$ to $C_{12}$ aryls (e.g., $C_7$ to $C_{20}$ alkylaryls), $C_1$ to $C_{12}$ alkoxys (e.g., phenoxy, methyoxy, ethyoxy, propoxy and benzoxy), $C_6$ to $C_{16}$ aryloxys, $C_7$ to $C_{18}$ alkylaryloxys and $C_1$ to $C_{12}$ heteroatom-containing hydrocarbons and substituted derivatives thereof, for example.

Other non-limiting examples of leaving groups include amines, phosphines, ethers, carboxylates (e.g., $C_1$ to $C_6$ alkylcarboxylates, $C_6$ to $C_{12}$ arylcarboxylates and $C_7$ to $C_{18}$ alkylarylcarboxylates), dienes, alkenes (e.g., tetramethylene, pentamethylene, methylidene), hydrocarbon radicals having from 1 to 20 carbon atoms (e.g., pentafluorophenyl) and combinations thereof, for example. In one, embodiment, two or more leaving groups form a part of a fused ring or ring system.

In a specific embodiment, L and A may be bridged to one another to form a bridged metallocene catalyst. A bridged metallocene catalyst, for example, may be described by the general formula:

$$XCp^ACp^BMA_n;$$ 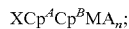

wherein X is a structural bridge, $Cp^A$ and $Cp^B$ each denote a cyclopentadienyl group or derivatives thereof, each being the same or different and which may be either substituted or unsubstituted, M is a transition metal and A is an alkyl, hydrocarbyl or halogen group and n is an integer between 0 and 4, and either 1 or 2 in a particular embodiment.

Non-limiting examples of bridging groups "X" include divalent hydrocarbon groups containing at least one Group 13 to 16 atom, such as, but not limited to, at least one of a carbon, oxygen, nitrogen, silicon, aluminum, boron, germanium, tin and combinations thereof; wherein the heteroatom may also be a $C_1$ to $C_{12}$ alkyl or aryl group substituted to satisfy a neutral valency. The bridging group may also contain substituent groups as defined above including halogen radicals and iron. More particular non-limiting examples of bridging group are represented by $C_1$ to $C_6$ alkylenes, substituted $C_1$ to $C_6$ alkylenes, oxygen, sulfur, $R_2C=$, $R_2Si=$, $—Si(R)_2Si(R_2)—$, $R_2Ge=$ or $RP=$ (wherein "=" represents two chemical bonds), where R is independently selected from: hydrides, hydrocarbyls, halocarbyls, hydrocarbyl-substituted organometalloids, halocarbyl-substituted organometalloids, disubstituted boron atoms, disubstituted Group 15 atoms, substituted Group 16 atoms and halogen radicals, for example. In one embodiment, the bridged metallocene catalyst component has two or more bridging groups.

Other non-limiting examples of bridging groups include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties, wherein the Si atom is replaced by a Ge or a C atom; dimethylsilyl, diethylsilyl, dimethylgermyl and/or diethylgermyl.

In another embodiment, the bridging group may also be cyclic and include 4 to 10 ring members or 5 to 7 ring members, for example. The ring members may be selected from the elements mentioned above and/or from: one or more of boron, carbon, silicon, germanium, nitrogen and oxygen, for example. Non-limiting examples of ring structures which may be present as or part of the bridging moiety are cyclobutylidene, cyclopentylidene, cyclohexylidene, cycloheptylidene, cyclooctylidene, for example. The cyclic bridging groups may be saturated or unsaturated and/or carry one or more substituents and/or be fused to one or more other ring structures. The one or more Cp groups which the above cyclic bridging moieties may optionally be fused to may be saturated or unsaturated. Moreover, these ring structures may themselves be fused, such as, for example, in the case of a naphthyl group.

In one embodiment, the metallocene catalyst includes CpFlu Type catalysts (e.g., a metallocene catalyst wherein the ligand includes a Cp fluorenyl ligand structure) represented by the following formula:

$$X(CpR^1{}_nR^2{}_m)(FlR^3{}_p);$$ 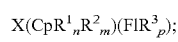

wherein Cp is a cyclopentadienyl group or derivatives thereof, Fl is a fluorenyl group, X is a structural bridge between Cp and Fl, $R^1$ is an optional substituent on the Cp, n is 1 or 2, $R^2$ is an optional substituent on the Cp bound to, a carbon immediately adjacent to the ipso carbon, m is 1 or 2 and each $R^3$ is optional, may be the same or different and may be selected from $C_1$ to $C_{20}$ hydrocarbyls. In one embodiment, at least one $R^3$ is substituted in either the 2 or 7 position on the fluorenyl group and at least one other $R^3$ being substituted at an opposed 2 or 7 position on the fluorenyl group and p is 2 or 4.

In yet, another aspect, the metallocene catalyst includes bridged mono-ligand metallocene compounds (e.g., mono cyclopentadienyl catalyst, components). In this embodiment, the metallocene catalyst is a bridged "half-sandwich" metallocene catalyst. In yet another aspect of the invention, the at least one metallocene catalyst component is an unbridged "half sandwich" metallocene. (See, U.S. Pat. Nos. 6,069,213, 5,026,798, 5,703,187, 5,747,406, 5,026,798 and U.S. Pat. No. 6,069,213, which are incorporated by reference herein.)

Non-limiting examples of metallocene catalyst components consistent with the description herein include, for example cyclopentadienylzirconium$A_n$; indenylzirconium$A_n$; (1-methylindenyl)zirconium$A_n$; (2-methylindenyl)zirconium$A_n$, (1-propylindenyl)zirconium$A_n$; (2-propylindenyl)zirconium$A_n$; (1-butylindenyl)zirconium$A_n$; (2-butylindenyl)zirconium$A_n$; methylcyclopentadienylzirconium$A_n$; tetrahydroindenylzirconium$A_n$; pentamethylcyclopentadienylzirconium$A_n$; cyclopentadienylzirconium$A_n$; pentamethylcyclopentadienyltitanium$A_n$; tetramethylcyclopentyltitanium$A_n$; (1,2,4-trimethylcyclopentadienyl)zirconium$A_n$; dimethylsilyl(1,2,3,4-tetramethylcyclopentadienyl)(cyclopentadienyl)zirconium$A_n$; dimethylsilyl(1,2,3,4-tetramethylcyclopentadienyl)(1,2,3-trimethylcyclopentadienyl)zirconium$A_n$; dimethylsilyl(1,2,3,4-tetramethylcyclopentadienyl)(2-dimethylcyclopentadienyl)zirconium$A_n$; dimethylsilyl(1,2,3,4-tetramethylcyclopentadienyl)(2-methylcyclopentadienyl)zirconium$A_n$; dimethylsilylcyclopentadienylindenylzirconium$A_n$; dimethylsilyl(2-methylindenyl)(fluorenyl)zirconium$A_n$; diphenylsilyl(1,2,3,4-tetramethylcyclopentadienyl)(3-propylcyclopentadienyl)zirconium$A_n$; dimethylsilyl (1,2,3,4-tetramethylcyclopentadienyl)(3-t-butylcyclopentadienyl)zirconium$A_n$; dimethylgermyl(1,2-dimethylcyclopentadienyl)(3-isopropylcyclopentadienyl)zirconium$A_n$; dimethylsilyl(1,2, 3,4-tetramethylcyclopentadienyl)(3-methylcyclopentadienyl)zirconium$A_n$; diphenylmethylidene(cyclopentadienyl)(9-fluorenyl)zirconium$A_n$; diphenylmethylidenecyclopentadienylindenylzirconium$A_n$; isopropylidenebiscyclopentadienylzirconium$A_n$; isopropylidene(cyclopentadienyl)(9-fluorenyl)zirconium$A_n$; isopropylidene(3-methylcyclopentadienyl)(9-fluorenyl)zirconium$A_n$; ethylenebis(9-fluorenyl)zirconium$A_n$; ethylenebis(1-indenyl)zirconium$A_n$; ethylenebis(1-indenyl)zirconium$A_n$; ethylenebis(2-methyl-1-indenyl)zirconium$A_n$; ethylenebis(2-methyl-4,5,6,7-tetrahydro-1-indenyl)zirconium$A_n$; ethylenebis(2-propyl-4,5,6,7-tetrahydro-1-indenyl)zirconium$A_n$; ethylenebis(2-isopropyl-4,5,6,7-tetrahydro-1-indenyl)zirconium$A_n$; ethylenebis(2-butyl-4,5,6,7-tetrahydro-1-indenyl)zirconium$A_n$; ethylenebis(2-isobutyl-4,5,6,7-tetrahydro-1-indenyl)zirconium$A_n$; dimethylsilyl(4,5,6,7-tetrahydro-1-indenyl)zirconium$A_n$; diphenyl(4,5,6,7-tetrahydro-1-indenyl)zirconium$A_n$; ethylenebis(4,5,6,7-tetrahydro-1-indenyl)zirconium$A_n$; dimethylsilylbis(cyclopentadienyl)zirconium$A_n$; dimethylsilylbis(9-fluorenyl)zirconium$A_n$; dimethylsilylbis(1-indenyl)zirconium$A_n$; dimethylsilylbis(2-methylindenyl)zirconium$A_n$; dimethylsilylbis(2-propylindenyl)zirconium$A_n$; dimethylsilylbis(2-butylindenyl)zirconium$A_n$; diphenylsilylbis(2-methylindenyl)zirconium$A_n$; diphenylsilylbis(2-propylindenyl)zirconium$A_n$; diphenylsilylbis(2-butylindenyl)zirconium$A_n$; dimethylgermylbis(2-methylindenyl)zirconium$A_n$; dimethylsilylbistetrahydroindenylzirconium$A_n$; dimethylsilylbistetramethylcyclopentadienylzirconium$A_n$; dimethylsilyl(cyclopentadienyl)(9-fluorenyl)zirconium$A_n$; diphenylsilyl(cyclopentadienyl)(9-fluorenyl)zirconium$A_n$; diphenylsilylbisindenylzirconium$A_n$; cyclotrimethylenesilyltetramethylcyclopentadienylcyclopentadienylzirconium$A_n$; cyclotettamethylenesilyltetramethylcyolopentadienylcyclopentadienylzirconium$A_n$; cyclotrimethylenesilyl(tetramethylcyclopentadienyl)(2-methylindenyl)zirconium$A_n$; cyclotrimethylenesilyl(tetramethylcyclopentadienyl)(3-methylcyclopentadienyl)zirconium$A_n$; cyclotrimethylenesilylbis(2-methylindenyl)zirconium$A_n$; cyclotrimethylenesilyl(tetramethylcyclopentadienyl)(2,3,5-trimethylclopentadienyl)zirconium$A_n$; cyclotrimethylenesilylbis(tetramethylcyclopentadienylzirconium$A_n$; dimethylsilyl(tetramethylcyclopentadienyl)(N-tertbutylamido)titanium$A_n$; biscyclopentadienylchromium$A_n$; biscyclopentadienylzirconium$A_n$; bis(n-butylcyclopentadienyl)zirconium$A_n$; bis(n-dodecyclcyclopentadienyl)zirconium$A_n$; bisethylcyclopentadienylzirconium$A_n$; bisisobutylcyclopentadienylzirconium$A_n$; bisisopropylcyplopfentadienylzirconiumN; bismethylcyclopentadienylzirconium$A_n$; bisoctyleycyclopentadienylzitconium$A_n$; bis(n-pentylcyclopentadienyl)zirconium$A_n$; bis(n-propylcyclopentadienyl)zirconium$A_n$; bistrimothylsilylcyclopentadienylzirconium$A_n$; bis(1,3-bis(trimethylsilyl)cyclopentadienyl)zirconium$A_n$; bis(1-ethyl-2-methylcyclopentadienyl)zirconium$A_n$; bis(1-ethyl-3-methylcyclopentadienyl)zirconium$A_n$; bispentamethlcyclopentadienylzirconium$A_n$; bispentamethylcyclopentadienylzirconium$A_n$; bis(1-propyl-3-methylcyclopentadienyl)zirconium$A_n$; bis(1-n-butyl-3-methylcyclopentadienyl)zirconium$A_n$; bis(1-isobutyl-3-methylcyclopentadienyl)zirconium$A_n$; bis(1-propyl-3-butylcyclopentadienyl)zirconium$A_n$; bis(1,3-n-butylcyclopentadienyl)zirconium$A_n$; bis(4,7-dimethylindenyl)zirconium$A_n$; bisindenylzirconium$A_n$; bis(2-methylindenyl)zirconium$A_n$; cyclopentadienylindenylzirconium$A_n$; bis(n-propylcyclopentadienyl)hafnium$A_n$; bis(n-butylcyclopentadienyl)hafnium$A_n$; bis(n-pentylcyclopentadienyl)hafnium$A_n$; (n-propylcyclopentadienyl)(n-butylcyclopentadienyl)hafnium$A_n$; bis[(2-trimethylsilylethyl)cyclopentadienyl]hafnium$A_n$; bis(trimethylsilylcyclopentadienyl)hafnium$A_n$; bis(2-n-propylindenyl)hafnium$A_n$; bis(2-n-butylindenyl)hafnium$A_n$; dimethylsilylbis(n-propylcyclopentadienyl)hafnium$A_n$; dimethylsilylbis(n-butylcyclopentadienyl)hafnium$A_n$; bis(9-n-propylfluorenyl)hafnium$A_n$; bis(9-n-butylfluorenyl)hafnium$A_n$; (9-n-propylfluorenyl)(2-n-propylindenyl)hafnium$A_n$; bis(1-n-propyl-2-methylcyclopentadienyl)hafnium$A_n$; (n-propylcyclopentadienyl)(1-n-propyl-3-n-butylcyclopentadienyl)hafnium$A_n$; dimethylsilyltetramethylcyclopentadienylcyclopropylamidotitanium$A_n$; dimethylsilyltetramethyleyclopentadienylcyclobutylamidotitanium$A_n$; dimethylsilyltetraimethyleyclopentadienylcyclopentylamidotitanium$A_n$; dimethylsilyltetramethylcyclopentadienylcyclohexylamidotitanum$A_n$; dimdthylsilyltetramethylcyclopentadienylcycloheptytlamidotitanium$A_n$; dimethylsilyltetramethylcytlopentadienylcyclooctylamidotitanium$A_n$; dimethylsilyltetramethylcyclopentadienylcyclononylamidotitanium$A_n$; dimethylsilyltetramethylcyclopentadienylcyclodecylamidotitanium$A_n$; dimethylsilyltetramethylcyclopentadienylrcycloundecylamidotiianium$A_n$; dimethylsilyltetramethylcyclopentadienylcyclododecylamidotitanium$A_n$; dimethylsilyltetramethylcyclopentadienyl(sec-butylamido)titanium$A_n$; dimethylsilyl(tetramethylcyclopentadienyl)(n-octylamido)titanium$A_n$; dimethylsilyl(tetramethylcyclopentadienyl)(n-decylamido)titanium$A_n$; dimethylsilyl(tetramethylcyclopentadienyl)(n-octadecylamido)titanium$A_n$; dimethylsilylbis(cyclopentadienyl)zirconium$A_n$; dimethylsilylbis(tetramethylcyclopentadienyl)zirconium$A_n$; dimethylsilylbis(methylcyclopentadienyl)zirconium$A_n$; dimethylsilylbis(dimethylcyclopentadienyl)zirconium$A_n$; dimethylsilyl(2,4-dimethylcyclopentadienyl) (3',5'-dimethylcyclopentadienyl)zirconium$A_n$; dimethylsilyl(2,3,5-trimethylcyclopentadienyl)(2',4',5'-dimethylcyclopentadienyl)zirconium$A_n$; dimethylsilylbis(t-butylcyclopentadienyl)zirconium$A_n$; dimethylsilylbis(trimethylsilylcyclopentadienyl)zirconium$A_n$; dimethylsilylbis(2-trimethylsilyl-4-t-butylcyclopentadienyl)zirconium$A_n$; dimethylsilylbis(4,5,6,7-tetrahydroindenyl)zirconium$A_n$; dimethylsilylbis(indenyl)zirconium$A_n$; dimethylsilylbis(2-methylindenyl)zirconium$A_n$; dimethylsilylbis(2,4-dimethylindenyl)zirconium$A_n$; dimethylsilylbis(2,4,7-trimethylindenyl)zirconium$A_n$; dimethylsilylbis(2-methyl-4-phenylindenyl)zirconium$A_n$; dimethylsilylbis(2-ethyl-4-phenylindenyl)zirconium$A_n$; dimethylsilylbis(benz[e]indenyl)zirconium$A_n$; dimethylsilylbis(2-methylbenz[e]indenyl)zirconium$A_n$; dimethylsilylbis(benz[f]indenyl)zirconium$A_n$; dimethylsilylbis(2-methylbenz[f]indenyl)zirconium$A_n$; dimethylsilylbis(3-methylbenz[f]indenyl)zirconium$A_n$; dimethylsilylbis(cyclopenta[cd]indenyl)zirconium$A_n$; dimethylsilylbis(cyclopentadienyl)zirconium$A_n$; dimethylsilylbis(tetramethylcyclopentadienyl)zirconium$A_n$; dimethylsilylbis(methylcyclopentadienyl)zirconium$A_n$; dimethylsilylbis(dimethylcyclopentadienyl)zirconium$A_n$; isopropylidene(cyclopentadienyl-fluorenyl)zirconium$A_n$; isopropylidene(cyclopentadienyl-indenyl)zirconium$A_n$; isopropylidene(cyclopentadienyl-2,7-di-t-butylfluorenyl)zirconium$A_n$; isopropylidene(cyclopentadienyl-3-methylfluorenyl)zirconium$A_n$; isoropylidene(cyclopentadienyl-4-methylfluorenyl)zirconium$A_n$; isopropylidene(cyclopentadienyl-octahydrofluorenyl)zirconium$A_n$; isopropylidene (methylcyclopentadienyl-fluorenyl)zirconium$A_n$; isopropylidene(dimethylcyclopentadienylfluorenyl)zirconium$A_n$; isopropylidene(tetramethylcyclopentadienyl-fluorenyl)zirconium$A_n$; diphenylmethylene(cyclopentadienyl-fluorenyl)zirconium$A_n$; diphenylmethylene (cyclopentadienyl-indenyl)zirconium$A_n$; diphenylmethylene(cyclopentadienyl-2,7-di-t-butylfluorenyl)zirconium$A_n$; diphenylmethylene(cyclopentadienyl-3-methylfluorenyl)zirconium$A_n$; diphenylmethylene(cyclopentadienyl-4-methylfluorenyl)zirconium$A_n$; diphenylmethylene(cyclopentadienyloctahydrofluorenyl)zirconium$A_n$; diphenylmethylene(methylcyclopentadienyl-fluorenyl)zirconium$A_n$; diphenylmethylene(dimethylcyclopentadienyl-fluorenyl)zirconium$A_n$; diphenylmethylene (tetramethylcyclopentadienyl-fluorenyl)zirconium$A_n$; cyclohexylidene(cyclopentadienyl-fluorenyl)zirconium$A_n$; cyclohexylidene(cyclopentadienylindenyl)zirconium$A_n$; cyclohexylidene(cyclopentadienyl-2,7-di-t-butylfluorenyl)zirconium$A_n$; cyclohexylidene(cyclopentadienyl-3-methylfluorenyl)zirconium$A_n$; cyclohexylidene(cyclopentadienyl-4-methylfluorenyl)zirconium$A_n$; cyclohexylidene (cyclopentadienyloctahydrofluorenyl)zirconium$A_n$; cyclohexylidene(methylcyclopentadienylfluorenyl)zirconium$A_n$; cyclohexylidene(dimethylcyclopentadienyl-fluorenyl)zirconium$A_n$; cyclohexylidene(tetramethylcyclopentadienylfluorenyl)zirconium$A_n$; dimethylsilyl (cyclopentadienyl-fluorenyl)zirconium$A_n$; dimethylsilyl (cyclopentadienyl-indenyl)zirconium; dimethylsilyl (cyclopentadienyl-2,7-di-t-butylfluorenyl)zirconium$A_n$; dimethylsilyl(cyclopentadienyl-3-methylfluorenyl)zirconium$A_n$; dimethylsilyl(cyclopentadienyl-4-methylfluorenyl)zirconium$A_n$; dimethylsilyl(cyclopentadienyl-octahydrofluorenyl)zirconium$A_n$; dimethylsilyl (methylcyclopentadienylfluorenyl)zirconium$A_n$; dimethylsilyl(dimethylcyclopentadienylfluorenyl)zirconium$A_n$; dimethylsilyl(tetramethylcyclopentadienylfluorenyl)zirconium$A_n$; isopropylidene(cyclopentadienyl-fluorenyl)zirconium$A_n$; isopropylidene(cyclopentadienyl-indenyl)zirconium$A_n$; isopropylidene(cyclopentadienyl-2,7-di-t-butylfluorenyl)zirconium$A_n$; cyclohexylidene (cyclopentadienylfluorenyl)zirconium$A_n$; cyclohexylidene (cyclopentadienyl-2,7-di-t-butylfluorenyl)zirconium$A_n$; dimethylsilyl(cyclopentadienylfluorenyl)zirconium$A_n$; methylphenylsilyltetramethylcyclopentadienylcyclopropylamidotitanium$A_n$; methylphenylsilyltetramethylcyclopentadienylcyclobutylamidotitanium$A_n$; methylphenylsilyltetramethylcyclopentadienylcyclopentylamidotitanium$A_n$; methlphenylsilyltetramethylcyclopentadieiiylcyclohexylwnidotitanium$A_n$; methylphenylsilyltetramethylcyplopentadienylcycloheptylamidotitaniumA, methylphenylsilyltetramethylcyclopentadienylcyclooctylamidotitanium$A_n$; methylphenylsilyltetramethylcyclopentadienylcyclononylamidotitanium$A_n$; methylphenylsilyltetramethylcycloypentadienylcyclodecylamidotitanium$A_n$; methylphenylsilyltetramethylcyclopentadienylcycloundecvlamidotitanium$A_n$; methylphenylsilyltetramethyicyclopentadienylcvclbododecvlamidotitanium$A_n$; methylphenylsilyl(tetramethylcyclopentadienyl)(sec-butylamido)titanium$A_n$; methylphenyl silyl(tetramethylcyclopentadienyl)(n-octylamido)titanium$A_n$; methylphenylsilyl (tetramethylcyclopentadienyl)(n-decylamido)titanium$A_n$; methylphenylsilyl(tetramethylcyclopentadienyl)(n-octadecylamido)titanium$A_n$; diphenylsilyltetramethylcyclopentadienylcyclopropylamidotitanium$A_n$; diphenylsilyltetramethylcyclopentadienylcyclobutylamidotitanium$A_n$; diphenylsilyltetraethylcyclopentadienylcyclopentylamidotitanium$A_n$; diphenylsilyltetramethylcyclopentadienylcyclohexylamidotitanium$A_n$; dihenylsilyltetramethylcyclopentadienylcycloheptylamidotitanium$A_n$; diphenylsilyltetramethylcyclopentadienylcyclooctylamidotitaniun$A_n$; diphenylsilyltetramethylcyclopentadienylcyclononylamidotitaniun$A_n$; diphenylsilyltetramethylcyclopentadienylcyclodecylamidotitanium$A_n$; diphenylsilyltetramethylcyclopentadienylcycloundecylamidotitanium$A_n$; diphenylsilyltetramethylcyclopentadienylcyclododecylamidotitanium$A_n$; diphenylsilyl (tetramethylcyclopentadienyl) sec-butylamido)titanium$A_n$; diphenylsilyl(tetramethylcyclopentadienyl)(n-octylamido) titanium$A_n$; diphenylsilyl(tetramethylcyclopentadienyl)(n-decylamido)titanium$A_n$; and diphenylsilyl(tetramethylcyclopentadienyl)(n-octadecylamido)titanium$A_n$;

In one or more embodiments, the transition metal compound includes cyclopentadienyl ligands, indenyl ligands, fluorenyl ligands, tetrahydroindenyl ligands, CpFlu type catalysts, alkyls, aryls, amides or combinations thereof. In one or more embodiments, the transition metal compound includes a transition metal dichloride, dimethyl or hydride. In one specific embodiment, the transition metal compound includes rac-dimethylsilanylbis(2-methyl-4-phenyl-1-indenyl)zirconium dichloride.

One or more embodiments may further include contacting the impregnated support with a plurality of catalyst compounds (e.g. a bimetallic catalyst). As used herein, the term "bimetallic catalyst" means any composition, mixture or system that includes at least two different catalyst compounds. Each catalyst compound may reside on a single support particle so that the bimetallic catalyst is a supported bimetallic catalyst. However, the term bimetallic, catalyst also broadly includes a system or mixture in which one of the catalysts resides on one collection of support particles and another catalyst resides on another collection of support, particles. The plurality of catalyst components may include any catalyst component known to one skilled in the art, so long as at least one of those catalyst components includes a transition metal compound as described herein.

Optionally, the impregnated support, the transition metal compound, the catalyst system or combinations thereof, may be contacted with one or more scavenging compounds prior to or during polymerization. The term "scavenging compounds" is meant to include those compounds effective for removing impurities (e.g., polar impurities) from the subsequent polymerization reaction environment. Impurities may be inadvertently introduced with any of the polymerization reaction components, particularly with solvent, monomer and catalyst feed, and adversely affect catalyst activity and stability. Such impurities may result in decreasing, or even elimination, of catalytic activity, for example. The polar impurities or catalyst poisons may include water, oxygen and metal impurities, for example.

The scavenging compound may include an excess of the aluminum containing compounds described above, or may be additional known organometallic compounds, such as Group 13 organometallic compounds. For example, the scavenging compounds may include triethyl aluminum (TMA), triisobutyl aluminum (TIBAl), methylalumoxane (MAO), isobutyl aluminoxane and tri-n-octyl aluminum. In one specific embodiment, the scavenging compound is TIBAl.

In one embodiment, the amount of scavenging compound is minimized during polymerization to that amount effective to enhance activity and avoided altogether if the feeds and polymerization medium, may be sufficiently free of impurities.

As demonstrated in the examples that follow, contacting the impregnated support with the transition metal compound via the methods described herein unexpectedly results in a supported catalyst composition that is active without alkylation processes (e.g., contact of the catalyst component with an organometallic compound, such as MAO.) Such processes are further expected to reduce the amount of byproducts released into the environment as a result of the fluorination process as compared with other fluorination methods.

Polymerization Processes

As indicated elsewhere herein, catalyst systems are used to form polyolefin compositions. Once the catalyst system is prepared, as described above and/or as known to one skilled in the art, a variety of processes may be carried out using that composition. The equipment, process conditions, reactants, additives and other materials used in polymerization processes will vary in a given process, depending on the desired composition and properties of the polymer being formed. Such processes may include solution phase, gas phase, slurry phase, bulk phase, high pressure processes or combinations thereof, for example. (See, U.S. Pat. Nos. 5,525,678; 6,420,580; 6,380,328; 6,359,072; 6,346,586; 6,340,730; 6,339,134; 6,300,436; 6,274,684; 6,271,323; 6,248,845; 6,245,868; 6,245,705; 6,242,545; 6,211,105; 6,207,606; 6,180,735 and U.S. Pat. No. 6,147,173, which are incorporated by reference herein.)

In certain embodiments, the processes described above generally include polymerizing one or more olefin monomers to form polymers. The olefin monomers may include $C_2$ to $C_{30}$ olefin monomers, or $C_2$ to $C_{12}$ olefin monomers (e.g., ethylene, propylene, butene, pentene, methylpentene, hexene, octene and decene), for example. The monomers may include ethylenically unsaturated monomers, $C_4$ to $C_{18}$ diolefins, conjugated or nonconjugated dienes, polyenes, vinyl monomers and cyclic olefins, for example. Non-limiting examples of other monomers may include norbornene, nobornadiene, isobutylene, isoprene, vinylbenzocyclobutane, sytrene, alkyl substituted styrene, ethylidene norbornene, dicyclopentadiene and cyclopentene, for example. The formed polymer may include homopolymers, copolymers or terpolymers, for example.

Examples of solution processes are described in U.S. Pat. Nos. 4,271,060, 5,001,205, 5,236,998 and U.S. Pat. No. 5,589,555, which are incorporated by reference herein.

One example of a gas phase polymerization process includes a continuous cycle system, wherein a cycling gas stream (otherwise known as a recycle stream or fluidizing medium) is heated in a reactor by heat of polymerization. The heat is removed from the cycling gas stream in another part of the cycle by a cooling system external to the reactor. The cycling gas, stream containing one or more monomers may be continuously cycled through a fluidized bed in the presence of a catalyst under reactive conditions. The cycling gas stream is generally withdrawn from the fluidized bed and recycled back into the reactor. Simultaneously, polymer product may be withdrawn from the reactor and fresh monomer may be added to replace the polymerized monomer. The reactor pressure in a gas phase process may vary from about 100 psig to about 500 psig, or from about 200 psig to about 400 psig or from about 250 psig to about 350 psig, for example. The reactor temperature in a gas phase process may vary from about 30° C. to about 120° C., or from about 60° C. to about 115° C., or from about 70° C. to about 1.10° C. or from about 70° C. to about 95° C., for example. (See, for example, U.S. Pat. Nos. 4,543,399; 4,588,790; 5,028,670; 5,317,036; 5,352,749; 5,405,922; 5,436,304; 5,456,471; 5,462,999; 5,616,661; 5,627,242; 5,665,818; 5,677,375 and U.S. Pat. No. 5,668,228, which are incorporated by reference herein.)

Slurry phase processes generally include forming a suspension of solid, particulate polymer in a liquid polymerization medium, to which monomers and optionally hydrogen, along with catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to $C_7$ alkane (e.g., hexane or isobutane), for example. The medium employed is generally liquid under the conditions of polymerization and relatively inert. A bulk phase process is similar to that of a slurry process with the exception that the liquid medium is also the reactant, (e.g., monomer) in a bulk phase process. However, a process may be a bulk process, a slurry process or a bulk slurry process, for example.

In a specific embodiment, a slurry process or a bulk process may be carried out continuously in one or more loop reactors. The catalyst, as slurry or as, a dry free flowing powder, may be injected regularly to the reactor loop, which can itself be filled with circulating slurry of growing polymer particles in a diluent, for example. Optionally, hydrogen may be added to the process, such as for molecular weight control of the resultant polymer. The loop reactor may be maintained at a pressure of from about 27 bar to about 50 bar or from about 35 bar to about 45 bar and a temperature of from about 38° C. to about 121° C., for example. Reaction heat may be removed through the loop wall via any method known to one skilled in the art, such as via a double-jacketed pipe or heat exchanger, for example.

Alternatively, other types of polymerization processes may be used, such as stirred reactors in series, parallel or combinations thereof, for example. Upon removal from the reactor, the polymer may be passed to a polymer recovery system for further processing, such as addition of additives and/or extrusion, for example.

Polymer Product

The polymers (and blends thereof) formed via the processes described herein may include, but are not limited to, linear low density polyethylene, elastomers, plastomers; high density polyethylenes, low density polyethylenes, medium density polyethylenes, polypropylene and polypropylene copolymers, for example.

In one embodiment, the polymer includes syndiotactic polypropylene. The syndiotactic, polypropylene may be formed by a supported catalyst composition including a CpFlu type catalyst.

In one embodiment, the polymer includes isotactic polypropylene. The isotactic polypropylene may be formed by a supported catalyst composition including dimethylsilyl-bis(2-methyl-4-phenyl-indenyl)zirconium dichloride as the transition metal compound.

In one embodiment, the polymer includes a bimodal molecular weight distribution. The bimodal molecular weight distribution polymer may be formed by a supported catalyst composition including a plurality of transition metal compounds.

In one or more embodiments, the polymer has a narrow molecular weight distribution (e.g., a molecular weight distribution of from about 2 to about 4). In another embodiment, the polymer has a broad molecular weight distribution (e.g., a molecular weight distribution of from about 4 to about 25).

Product Application

The polymers and blends thereof are useful in applications known to one skilled in the art, such as forming operations (e.g., film, sheet, pipe and fiber extrusion and co-extrusion as well as blow-molding, injection molding and rotary molding). Films include blown, oriented or cast films formed by extrusion or co-extrusion or by lamination useful as shrink film, cling film, stretch film, sealing films, oriented films, snack packaging, heavy duty bags, grocery sacks, baked and frozen food packaging, medical packaging, industrial liners, and membranes, for example, in food-contact and non-food contact application. Fibers include slit-films, monofilaments, melt spinning, solution spinning and melt blown fiber operations for use in woven or non-woven form to make sacks, bags, rope, twine, carpet backing, carpet yarns, filters, diaper fabrics, medical garments and geotextiles, for example. Extruded articles include medical tubing, wire and cable coatings, sheet, thermoformed sheet, geomembranes and pond liners, for example. Molded articles include single and multi-layered constructions in the form of bottles, tanks, large hollow articles, rigid food containers and toys, for example.

While the foregoing is directed to embodiments of the present invention, other and further embodiments of the invention may be devised without departing from the basic scope thereof and the scope thereof is determined by the claims that follow.

What is claimed is:

1. A method of forming a supported catalyst system comprising:
    providing an inorganic support material;
    contacting the inorganic support material with a support solvent to form a support solution;
    contacting the support solution with a fluorine containing compound represented by the formula $AlF_pX_{3-p}B_q$ to impregnate the fluorine containing compound within the inorganic support material and form an intermediate, wherein X is selected from Cl, Br and OH$^-$, B is $H_2O$, p is selected from 1 to 3 and q is selected from 0 to 6;
    drying the intermediate to remove the solvent therefrom and heating the intermediate at a temperature of at least about 300° C. to form an impregnated support; and
    contacting the impregnated support with a transition metal compound to form a supported catalyst system, wherein the transition metal compound is represented by the formula $[L]_mM[A]_n$; wherein L is a ligand, A is a leaving group, M is a transition metal and m and n are such that a total ligand valency corresponds to the transition metal valency.

2. The method of claim 1, wherein the inorganic support material is selected from silica, alumina and combinations thereof.

3. The method of claim 1, wherein the contact of the support solution with the fluorine containing compound forms chemical bonds resulting in an intermediate exhibiting a bonding sequence selected from Si—O—Al—F and Si—O—Al—O—Al—F.

4. The method of claim 1, wherein the fluorine containing compound comprises $AlF_3$.

5. The method of claim 1, wherein the support solution exhibits a neutral pH.

6. The method of claim 1, wherein the inorganic support material comprises an alumina source and a silica source.

7. The method of claim 6, wherein the support solution comprises a silica support solution and an alumina support solution, the silica support solution and the alumina support solution prepared independently and then mixed together prior to contact with the fluorine containing compound.

8. The method of claim 6, wherein the support solution comprises a silica support solution and an alumina support solution and wherein the fluorine containing compound contacts the alumina support solution prior to contact with the silica support solution.

9. The method of claim 1, wherein the inorganic support material comprises a silica source.

10. The method of claim 9, wherein the support solution comprises a silica support solution and wherein the silica support solution is prepared independently and mixed together prior to contact with the fluorine containing compound.

11. A supported metallocene catalyst composition formed by the method of claim 1.

12. The method of claim 1 further comprising contacting the supported catalyst system with an olefin monomer to form a polyolefin.

13. The method of claim 12 further comprising contacting the supported catalyst system with an olefin monomer to form a polyolefin, wherein the polyolefin comprises a polymer selected from ethylene, a $C_3$ or greater alpha olefin, a $C_4$ or greater conjugated diene, an ethylene-alpha olefin copolymer or combinations thereof.

14. The method of claim 1 further comprising contacting the supported catalyst system with a propylene monomer to form isotactic polypropylene.

15. A olefin polymerization process comprising:
    providing an inorganic support material;
    contacting the inorganic support material with a support solvent to form a support solution;
    contacting the support solution with a fluorine containing compound represented by the formula $AlF_pX_{3-p}B_q$ to impregnate the fluorine containing compound within the inorganic support material and form an intermediate, wherein X is selected from Cl, Br and OH$^-$, B is $H_2O$, p is selected from 1 to 3 and q is selected from 0 to 6;
    drying the intermediate to remove the solvent therefrom and heating the intermediate at a temperature of at least about 300° C. to form an impregnated support;
    contacting the impregnated support with a transition metal compound to form a supported catalyst system, wherein the transition metal compound is represented by the formula $[L]_mM[A]_n$; wherein L is a bulky ligand, A is a leaving group, M is a transition metal and m and n are such that a total ligand valency corresponds to the transition metal valency; and
    contacting the supported catalyst system with an olefin monomer to form a polyolefin, wherein the polyolefin comprises a polymer selected from ethylene, a $C_3$ or greater alpha olefin, a $C_4$ or greater conjugated diene, an ethylene-alpha olefin copolymer or combinations thereof.

16. The process of claim 15, wherein the transition metal compound contacts the impregnated support in-situ.

17. The process of claim 15, wherein the supported catalyst system is formed without producing ammonia.

18. A method of forming a supported catalyst system comprising:
- providing an inorganic support material comprising a silica source;
- contacting the inorganic support material with a solvent to form a support solution;
- contacting the support solution with a fluorine containing compound represented by the formula $AlF_3$ or $AlF_3 \cdot 3H_2O$, wherein the contact of the support solution with the fluorine containing compound forms chemical bonds resulting in an intermediate exhibiting a bonding sequence selected from Si—O—Al—F and Si—O—Al—O—Al—F;
- drying the intermediate to remove the solvent therefrom and heating the intermediate at a temperature of at least about 300° C. to form an impregnated support; and
- contacting the impregnated support with a transition metal compound to form a supported catalyst system, wherein the transition metal compound is represented by the formula $[L]_m M[A]_n$; wherein L is a ligand, A is a leaving group, M is a transition metal and m and n are such that a total ligand valency corresponds to the transition metal valency.

* * * * *